(12) United States Patent
Gendron

(10) Patent No.: US 8,229,703 B2
(45) Date of Patent: Jul. 24, 2012

(54) ACCURATE AND COMPUTATIONALLY EFFICIENT METHOD OF NON-CENTRAL CHI SQUARE PROBABILITY DENSITY FUNCTION

(75) Inventor: Paul John Gendron, San Diego, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 304 days.

(21) Appl. No.: 12/504,103

(22) Filed: Jul. 16, 2009

(65) Prior Publication Data

US 2011/0015896 A1    Jan. 20, 2011

(51) Int. Cl.
*G06F 17/18* (2006.01)
(52) U.S. Cl. .................................................. 702/181
(58) Field of Classification Search ............... 702/181
See application file for complete search history.

(56) References Cited

OTHER PUBLICATIONS

Prathapasinghe Dharmawansa, New Series Representation for the Trivariate Non-Central Chi-Squared Distribution, IEEE Transactions on Communications, vol. 57, No. 3, Mar. 2009, p. 665-675.*

* cited by examiner

*Primary Examiner* — Tung S Lau
(74) *Attorney, Agent, or Firm* — Amy Ressing; Suresh Koshy

(57) ABSTRACT

Embodiments include systems and methods of non-coherent signal processing. For example, one embodiment includes a method of a non-coherent signal detection. The method includes receiving data indicative of a received signal, and evaluating a probability density function indicative of a signal parameter based on the received data. Evaluating the probability density function comprises identifying at least one of a plurality of terms of summation having at least one peak of the probability density function and evaluating the plurality of terms of a non-central chi-square distribution determining the signal parameter based at least in part on the received data and the calculated probability density.

6 Claims, 8 Drawing Sheets

ACCURATE AND COMPUTATIONALLY EFFICIENT METHOD OF NON-CENTRAL CHI SQUARE PROBABILITY DENSITY FUNCTION

BACKGROUND OF THE INVENTION

1. Field of the Invention

Embodiments are related to electronic signal processing, including, for example, non-coherent detection of a signal and the accurate performance assessment of the same.

2. Description of the Related Technology

Receivers for wireless communications and other signals can operate as coherent design, in which the frequency and phase of the carrier have been recovered, or as noncoherent, in which phase is not explicitly estimated. Non-coherent receivers generally have superior performance where factors such as fast frequency selection, large Doppler spread, strong phase noise, and/or co-channel interference are present. Moreover non-coherent receivers have minimal time delay for resynchronization. Examples of demodulation schemes that can be implemented using noncoherent demodulation include differential phase shift keying (DPSK), frequency shift keying (FSK), continuation phase modulation (CPM), quadrature phase-shift keying, and hybrids of these and other modulations.

Non-coherent receivers may use knowledge of aspects of the received signal in the form of a probability density function in order to tune parameters for optimal performance under diverse channel, propagation or noise conditions. For example, a signal may be represented as the transmitted signal plus additive white Gaussian noise (AWGN). A probability density function indicative of a signal so modeled can be used to make detection decisions in a receiver or to assess the performance of such a receiver. Such probability density functions can further model other aspects of the modulation scheme and/or characteristics associated with a particular channel or environment. These include average bit error rate or total attainable bits per second that the modulation and channel can support.

However, in some cases, calculation of the particular probability density function can be computationally complex and/or inaccurate as implemented in a digital computing system. Accordingly, a need exists for improved methods of calculating probability density functions for use in, for example but not limited to, communication systems.

SUMMARY OF CERTAIN INVENTIVE ASPECTS

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Embodiments" one will understand how the features of this invention provide advantages that include accuracy and reduced computation power for a desired accuracy.

One embodiment includes a method of a non-coherent detection of a transmitted data signal. The method includes receiving data indicative of a data signal by a receiver and evaluating, by the receiver, a non-central chi-square probability density function indicative of a parameter of the signal based on the received data. Evaluating the non-central chi-square probability density function indicative of the parameter of the signal comprises estimating at least one of a plurality of terms of summation for evaluating the probability density function based on a specified accuracy associated with each of the terms, and evaluating the plurality of terms of the non-central chi-square distribution. The method further comprises determining the signal parameter based at least in part on the received data and the calculated probability density.

One embodiment includes a device for a non-coherent detection of a transmitted data signal. The device includes a first circuit configured to receive data indicative of the signal and a second circuit configured to evaluate a non-central chi-square probability density function indicative of a parameter of the signal based on the received data. To evaluate the probability density function indicative of the parameter of the signal, the second circuit is configured to estimate at least one of a plurality of terms of summation for evaluating the probability density function based on a specified accuracy associated with each of the terms, and evaluate the plurality of terms of the non-central chi-square distribution. The processor is further configured to determine the signal parameter based at least in part on the received data and the calculated probability density.

One embodiment includes a device for a non-coherent detection of a transmitted data signal. The device includes means for receiving data indicative of the signal and means for evaluating a non-central chi-square probability density function indicative of a parameter of the signal based on the received data. The means for evaluating the probability density function indicative of the parameter of the signal comprises means for estimating at least one of a plurality of terms of summation for evaluating the probability density function based on a specified accuracy associated with each of the terms, and means for evaluating the plurality of terms of the non-central chi-square distribution. The device further comprises means for determining the signal parameter based at least in part on the received data and the calculated probability density.

One embodiment computer-program product for a non-coherent detection of a transmitted data signal. The product comprises a computer-readable medium having stored thereon codes executable by at least one processor to perform the method comprising receiving data indicative of a data signal by an electronic receiver associated with the processor and evaluating, by the receiver, a non-central chi-square probability density function indicative of a parameter of the signal based on the received data. Evaluating the non-central chi-square probability density function indicative of the parameter of the signal comprises estimating at least one of a plurality of terms of summation for evaluating the probability density function based on a specified accuracy associated with each of the terms, and evaluating the plurality of terms of the non-central chi-square distribution. The method performed by the processor further comprises determining the signal parameter based at least in part on the received data and the calculated probability density.

DETAILED DESCRIPTION OF CERTAIN EMBODIMENTS

The following detailed description is directed to certain specific embodiments of the invention. However, the invention can be embodied in a multitude of different ways as defined and covered by the claims. In this description, reference is made to the drawings wherein like parts are designated with like numerals throughout.

Embodiments include a method of a non-coherent detection and estimation of a transmitted data signal. For example, according to one embodiment, a method includes receiving data indicative of a data signal by a receiver and evaluating, by the receiver, a non-central chi-square probability density function indicative of a set of parameters of the signal based on the received data. Such parameters may be estimated to optimize receiver performance. Evaluating the non-central chi-square probability density function indicative of the parameters of the signal comprises estimating at least one of a plurality of terms associated with a summation ensuring that each term is composed in a computationally efficient manner and that parameters defining/delineating/enumerating the set of terms in the sum are accurately computed and accomplished in a computationally efficient manner. Such an embodiment further includes determining the signal parameter of this embodiment based at least in part on the received data and the parameters of the calculated probability density function.

Figure 1:
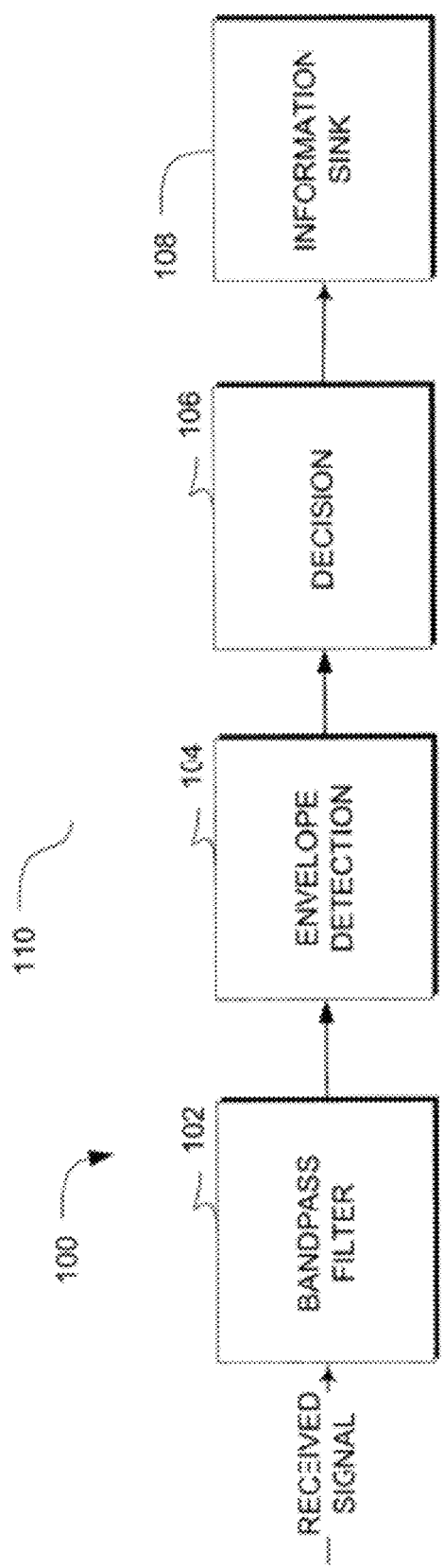
FIG. 1 is a block diagram illustrating one embodiment of a signal processing system.

FIG. 1 is a block diagram illustrating one embodiment of a signal processing system 100. The system 100 may be embodied as a receiver configured to receive a transmitted data signal. Such a receiver may be implemented as one or more modules embodied in an electronic device as one or more processors or other electronic circuits. For example, in one embodiment, the system 100 comprises a bandpass filter 102 that receives a signal from, for example, an antenna or receiver front-end and selectively passes one or more frequency bands associated with the received signal, e.g., a frequency band centered at a center frequency of the received signal. An envelope detection module 104 receives the filter signal and outputs signal data indicative of a parameter of the signal, e.g., the envelope of the signal. In one embodiment, the envelope detection module 104 identifies the envelope noncoherently (without phase information of the transmitted signal) and characterizes this envelope based on a calculated non-central chi-squared probability distribution function, for example, as discussed with respect to FIG. 3, 4, or 5. The output of the envelope detection module 104 is provided to a decision module 106 that further demodulates the received signal by making a detection signal regarding received symbols (or, in other embodiments, chips, and/or demodulated data). The decision module 106 may be configured to determine signal parameters such as error rates, to identify decision errors, or to make decisions based on a non-central chi-squared probability function calculated as described, for example, below with reference to FIG. 3, 4, or 5. Additionally the decision module may be required to estimate other latent parameters associated with the channel specific to the modulation scheme that lead to more optimal and robust performance of the system. An information sink 108, which may provide further signal decoding, formatting or other information extraction functions, or applications using the received data signal, receives and contextualizes the data for its intended application. As described in further detail below, in one embodiment, the system 100 comprises a non-coherent detector in which one or both of the envelope detection 104 and decision 106 modules estimates a signal parameter based on a calculated probability density function that is indicative of the signal parameter or data used to estimate the signal parameter. In one such embodiment, the probably density function is a non-central chi square density which is desirably calculated by identifying one or more peak terms and the second moment of the term Weights prior to calculation of the density. Desirably, such a methods reduces computational requirements for a give accuracy when implemented via a digital processor or other digital electronics. For example, in one embodiment, the estimated signal parameter is used to make a soft decision decoding and bit error rate computation in the noncoherent communication system 100.

Those of skill will recognize that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Figure 2:
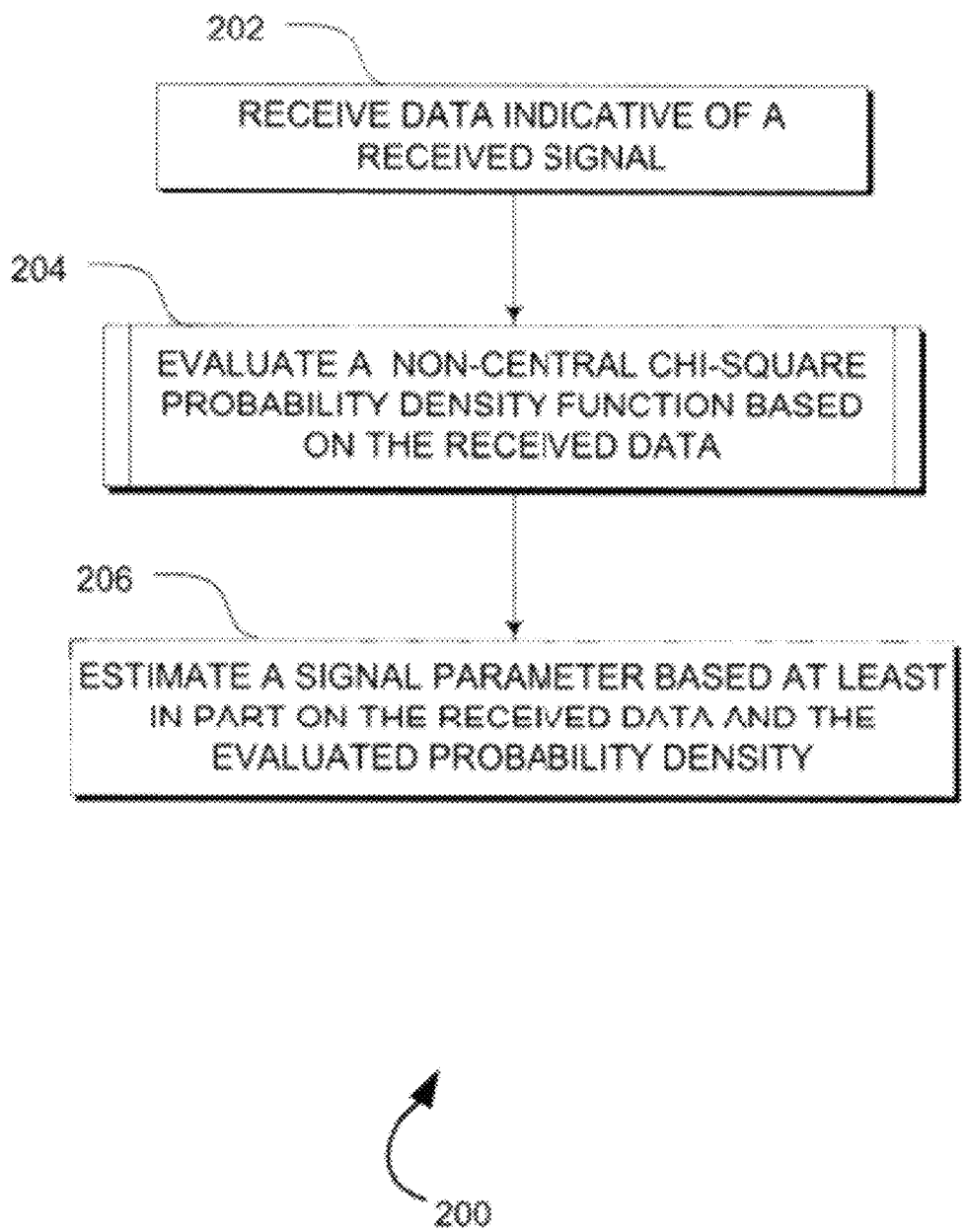
FIG. 2 is a flowchart illustrating one embodiment of a method of processing a signal such as in a system according to FIG. 1.

FIG. 2 is a flowchart illustrating one embodiment of a method 200 of processing a signal such as in a system 100. The method 200 begins at a block 202 in which, for example, the envelope detection module 104 or decision module 106, receives data indicative of a received signal. In one embodiment, the data is received from an antenna and further signal processing elements such as an analog/digital converter. Next at a block 204, that module of the system 100 evaluates a non-central chi-square probability density function indicative of a parameter of the received signal based on the received data. Moving to the block 206, the envelope detection module 104 or decision module 106 of the system 100 estimates a signal parameter, e.g., determines a detection decision, at least in part on the received data and on the evaluated probability density.

For example, a probability distribution function may be calculated according to one embodiment to estimate a signal parameter such as bit err rate, which is further used as part of the processing of a received signal. In another embodiment, such a process can be used in type I (1 transmitted but 0 detected) and type II (0 transmitted but 1 detected) error detection in the noncoherent communications system 100.

In some embodiments, probability density functions associated with a particular signal characteristic are modeled as noncentral chi square ($\chi^2$) densities. Such distributions are generalizations of the chi-square distribution. In particular, if $X_i$ are $\nu$ independent, normally distributed random variables with means $\mu_i$ and variances $\sigma_i^2$, then the random variable, e, is distributed according to the noncentral chi-square distribution.

$$e = \sum_{i=1}^{\nu} \left(\frac{X_i}{\sigma_i}\right)^2$$

The noncentral chi-square distribution has two parameters: $\nu$ which specifies the number of degrees of freedom (i.e. the number of Xi), and $\lambda$ which is related to the mean of the random variables Xi by:

$$\lambda = \sum_{i=1}^{\nu} \left(\frac{\mu_i}{\sigma_i}\right)^2$$

In a communication system, the number of degrees of freedom and the noncentrality parameter are suitably selected or estimated based on the signal, physics and system parameter known in the art and particular to a given implementation. The probability density at x can be represented analytically as:

$$\chi_\nu^2(x \mid \lambda) = \frac{1}{2}(x/\lambda)^{(\nu-2)/4} I_{\nu/2-1}\left(\sqrt{\lambda x}\right) e^{-(x+\lambda)/2}. \quad (1)$$

This expression however can be numerically difficult to calculate due to the computational difficulties associated with evaluation of the modified Bessel function for large arguments. Accurate methods of computing the non-central chi square density can be based on a representation of the density as a Poisson mixture of central chi square distributions over the degree of freedom parameter. Based on this good approximations of $\chi_\nu^2(x \mid \lambda)$ for x within a high probably region of the distribution can be made summing over this discrete mixture starting n at the nearest integer to the noncentrality, the mean of the Poisson density, $\lambda/2$. This approach is well understood writing $\chi_\nu^2(x \mid \lambda) = E_{n \mid \lambda}[\chi_{\nu+2n}^2(x)]$ where the expectation is with respect to the Poisson density:

$$P(n \mid \lambda) = \frac{(\lambda/2)^n}{n!} \exp(-\lambda/2) \quad (2)$$

and where the central chi-square density is:

$$\chi_\nu^2(x) = \frac{x^{\nu/2-1}}{2^{\nu/2}\Gamma(\nu/2+1)} \exp(-x/2). \quad (3)$$

Explicitly $$\chi_\nu^2(x; \lambda) = \sum_{n=0}^{\infty} P(n \mid \lambda) \chi_{\nu+2n}^2(x) \quad (4)$$

$$= \sum_{n=0}^{\infty} \frac{(\lambda/2)^n}{n!} \exp(-\lambda/2) \chi_{\nu+2n}^2(x)$$

Viewing the non-central chi-square density as an expectation leads to choosing the interval of summation to be over the high density region associated with the Poisson density and summing the weighted $\chi_{\nu+2n}^2(x)$ terms accordingly. This is not the case for x outside the high density region.

These Poisson weights and component terms of the sum can be computed recursively using equation (3) to express $$P(n+1 \mid \lambda) = \frac{\lambda}{2(n+1)} \times P(n \mid \lambda) \quad (5)$$

$$\chi_{\nu+2n+2}^2(x) = \frac{x}{2n+\nu} \times \chi_{\nu+2n}^2(x)$$

In such a recursion, each term can be computed with a single integer division and multiply. In order to apply this recursion, a further step includes determining which terms are to be computed and conversely which terms are to be ignored. Determining the terms to compute includes determining the domain, n ∈ D, that specifies the region of maximal contribution to the result, $\chi_\nu^2(x \mid \lambda)$. One way to identify the terms is to simply compute the sum starting the recursion (5) at the expectation of the Poisson mixture coefficients $n^P = \lfloor E[n \mid \lambda] \rfloor = \lfloor \lambda/2 \rfloor$ and to proceed to sum in both directions within the density until a specified upper tolerable bound on the error terms is reached.

Figure 3:
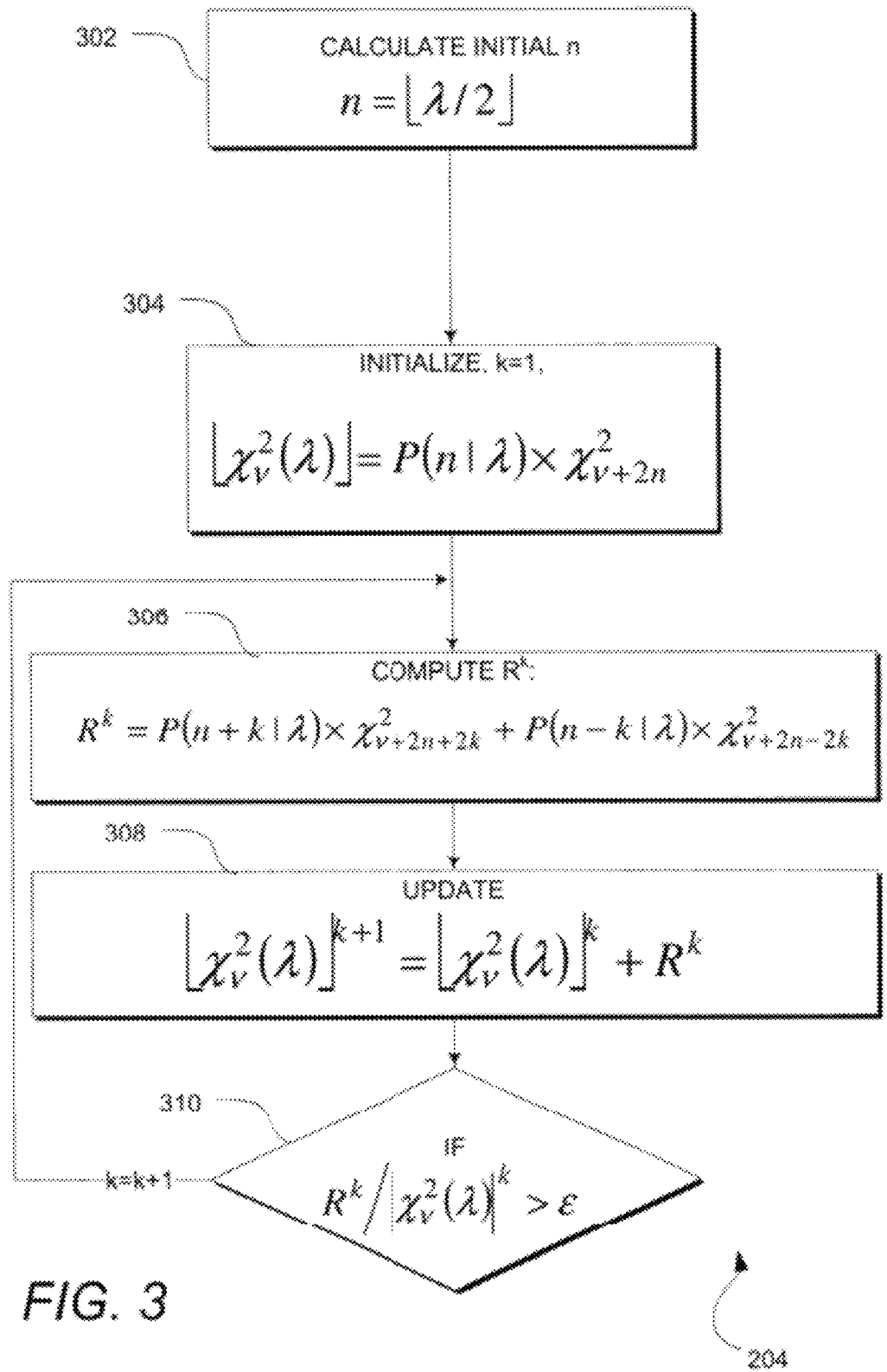
FIG. 3 is a flowchart illustrating in more detail a portion of the method of FIG. 2 according one embodiment of a method of processing a signal based on a probability density function.

FIG. 3 is a flowchart illustrating in more detail a process associated with the block 204 of the method 200 of processing a signal based on a probability density function. The method begins at a block 302 in which the initial term n is calculated using n=$\lfloor \lambda/2 \rfloor$. Moving to a block 304, the iteration variable k is initialized to 1 and the chi-square value is initialized based on the initial n as follows:

$$\lfloor \chi_\nu^2(\lambda) \rfloor = P(n^P \mid \lambda) \times \chi_{\nu+2n}^2$$

Moving to a block 306, an incremental value, Rk, of the density for the region of the current step is calculated based on equation 5 as follows:

$$R^k = P(n+k \mid \lambda) \times \chi_{\nu+2n+2k}^2 + P(n-k \mid \lambda) \times \chi_{\nu+2n-2k}^2$$

Next at a block 308, the chi square estimate for the recursive step is updated as follows from the partial integral for the current step.

$$\lfloor \chi_\nu^2(\lambda) \rfloor^{k+1} = \lfloor \chi_\nu^2(\lambda) \rfloor^k + R^k$$

At a decision block 310, the system 100 determines if the value of $R^{k+1}/|\chi_\nu^2(\lambda)|^k > \epsilon$, where $\epsilon = 10^{-B}$, where B is a desired degree of accuracy in terms of number of digits of accuracy in the computed result. If the additional value is greater than the threshold, the embodiment of the method 204 returns to the block 306 and performs another iteration. If the desired accuracy is achieved, the method ends and returns the chi-square estimate for the current step, k.

In either of the tail region of the distribution, methods such as illustrated in FIG. 3 tend to require reduced computational efficiency and accuracy because $n^P$ as determined in the block 302 can be far from the maximally contributing terms thus the method expends computational resources over terms that provide little in accuracy. Embodiments such as illustrated with reference to FIGS. 3 and 4 remedy this deficiency.

Figure 4:
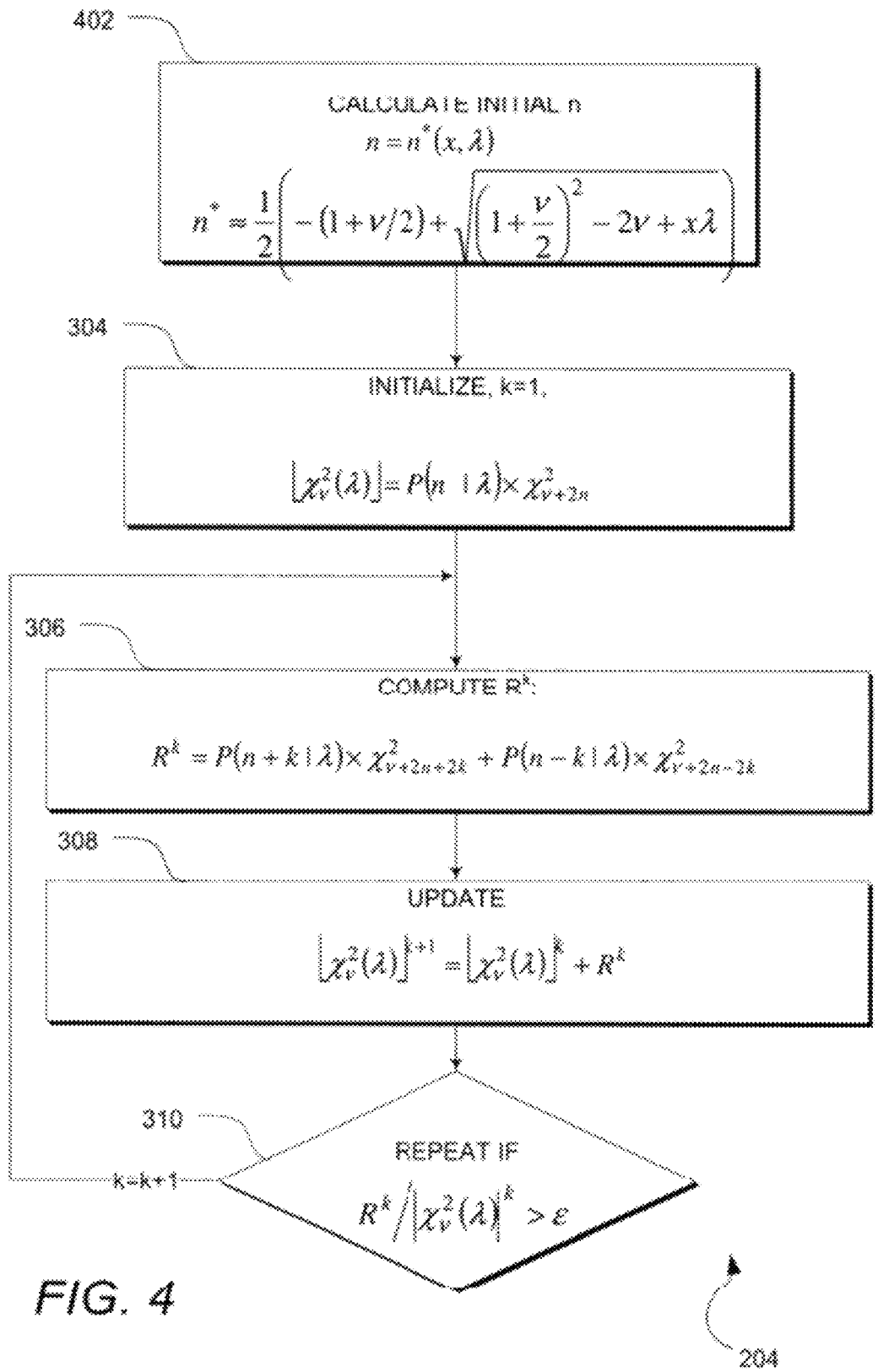
FIG. 4 is a flowchart illustrating in more detail a portion of the method of FIG. 2 according another embodiment of a method of processing a signal based on a probability density function.

FIG. 4 is a flowchart illustrating in more detail a portion of the method 200 according to another embodiment of the process associated with the block 204 of calculating the probability density function. In this embodiment, the domain of summation is selected to improve computational efficiency for a given accuracy. In particular, to determine the starting point for n, it is noted that as a function of n:

$$f(x, n \mid \lambda, \nu) \propto \frac{(x\lambda/4)^n}{\Gamma(\nu/2+n)\Gamma(n+1)}. \qquad (6)$$

If $D_f(n)$ is defined as follows:

$$\begin{aligned} D_f(n) &= \frac{d}{dn}\log f(x, n \mid \lambda, \nu) \\ &= \log(x\lambda/4) - \psi(n+1) - \psi(n+\nu/2) \\ &= \log(x\lambda/4) - \log((n+1)(n+\nu/2)) + \\ &\quad \frac{1/2}{n+\nu/2} + \frac{1/2}{n+1} + O(n^{-2}) \end{aligned}$$

where $\psi(n) = \log \Gamma(n)$. Define an approximate argmax$_n$ f(x, n|λν) for xλ>4 as the solution to log(xλ/4)≈λ/2=log((n+1)(n+λ/2)) This yields equation 7, below, for calculating the initial term.

$$n^* \approx \frac{1}{2}\left(-(1+\nu/2) + \sqrt{\left(1+\frac{\nu}{2}\right)^2 - 2\nu + x\lambda}\right) \qquad (7)$$

Note that under appropriate conditions this reduces to the Poisson mixture of weights ⌊λ/2⌋ but is further based on ν, die number of degrees of freedom associated with the probability density function. A desirable feature of using equation (7) is that it is relatively simple requiring only a square root operation on integers. In the tail regions n* is close to the peak value and is computationally efficiency relative to starting at ⌊λ/2⌋. To determine argmax$_n$ f(x,n|λν) exactly can be done with a few Newton-Raphson iterations starting from (7) as follows in equation 8.

$$n^{k+1} = n^k - Df(n^k)I^{-1}(n^k) \qquad (8)$$

where $$I(n) = -\frac{d^2}{dn^2}\log f(\delta, n \mid \lambda, \nu) = -\psi(n+1) - \psi(n+\nu/2)$$

and $n^1 = n^*$. Since n is an integer, a few iterations of equation (8) are sufficient to produce a result.

Hence, returning to FIG. 4, at a block 402, n* is computed as described above based on equation 7, or, in one embodiment, equation 8. From that initial value of n, the embodiment of the subprocess 204 proceeds to the block 304 and continues as described above with reference to FIG. 3. Desirably, this embodiment is computationally more efficient relative to the method of FIG. 3 for χ outside the high probability region. It does however require the initial computation of n* via equation (7) or equation (8) as well as retaining the need for computing the comparisons of the block 310 for each iteration. Employing the more accurate starting point of Equation (8) requires a Newton-Raphson iteration and thus the evaluation of the Information scale, I(n). Since integer arithmetic is computationally insignificant relative to floating point arithmetic the approach may be desirable for x outside the high probability region.

Figure 5:
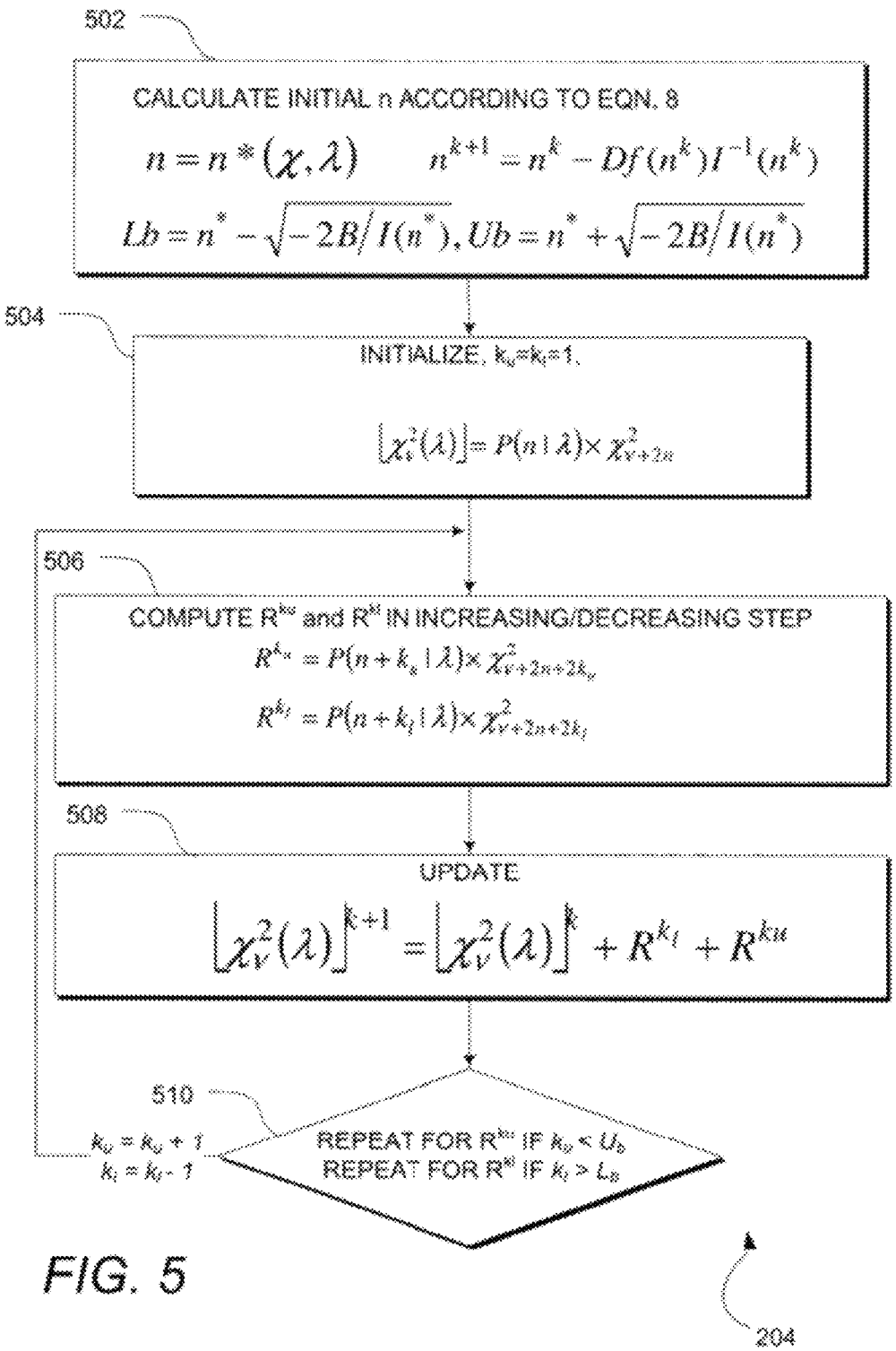
FIG. 5 is a flowchart illustrating in more detail a portion of the method of FIG. 2 according another embodiment of a method of processing a signal based on a probability density function.

FIG. 5 is a flowchart illustrating in more detail a portion of the method 200 according to another embodiment of the process associated with the block 204 of calculating the probability density function. In particular, there is a further advantage to computing the information scale as discussed with respect to FIG. 4, namely that it gives an approximate measure of the number of terms required. In the embodiment of the subprocess of the block 204 illustrated in FIG. 5, another embodiment provides for elimination of the comparison at the block 310 of the methods illustrated in FIGS. 3 and 4 by simply approximating the domain of summation with a Laplace approximation to f(x, n|λ, ν). The information scale is approximated with equation 9:

$$\begin{aligned} I(n) &= \frac{d^2}{dn^2}\log f(x, n \mid \lambda, \nu) \\ &= -\frac{1}{n+1} - \frac{1}{n+\nu/2} - \frac{1/2}{(n+\nu/2)^2} - \frac{1/2}{(n+1)^2} + O(n^{-2}). \end{aligned} \qquad (9)$$

These derivatives are approximations based on the truncated expansion of:

$$\log \Gamma(n) = (n-1/2)\log n - n + \log\sqrt{2\pi} + 1/12n + O(n^{-3})$$

where $O(n^{-3})$ is polynomial with maximal degree n. The number of bits per term f(x,n|λ, ν), or synonymously the number of decimal places of accuracy relative to an arbitrary standard (for instance, arg max$_n$ f(x, n|λ, ν) in the sum is proportional to log f(x, n|λ, ν). For accuracy to B decimal places, the sum may include terms for which log f(x, n|ν, λ))>−B+max$_n$ log f(x, n|ν, λ). Let $$n^* \text{argmax}_n \log f(x,n|\lambda\nu),$$

where D*(B)={n:|n−n*|2<−BI−1(n*)/2. Hence, the summation can include only the terms within D*(B). Desirably, computing the domain of summation a priori obviates the need to compute the relative errors as in the embodiments of FIGS. 3 and 4 at the block 310 and the computation can be performed with a for loop requiring only a counter. Also there is no need to sum the terms recursively. The terms can be summed from smaller to larger thus minimizing accumulation errors.

Returning to FIG. 5, the method begins at a block 502 in which n=n* (χ, λ) is computed according to equation 8. In addition, lower and upper bounds $U_b$ and $L_b$ of n are also computed according to the equations 10 below:

$$Lb = n^* - \sqrt{2B/I(n^*)},\ Ub = n^* + \sqrt{2B/I(n^*)} \qquad (10)$$

Next at a block 504, the initial values for indices $k_u$ and $k_l$=1 set and initial values are computed as described above with reference to the block 304 of FIGS. 3 and 4. In this illustrated embodiment, each loop increments the upper, $k_u$ and lower, $k_l$, indices and calculates from the maximal density n* outward in each direction. In other embodiments, iterations can be performed for each direction.

Moving to a block 506, the values for the step in each direction are calculated based on equation (5) as follows:

$$R^{k_u} = P(n+k_u|\lambda) \times \chi_{v+2n+2k_u}^2$$

$$R^{k_l} = P(n+k_l|\lambda) \times \chi_{v+2n+2k_l}^2$$

Next, at the block 508, the chi-square estimate is updated using both the lower and upper step values:

$$\lfloor \chi_v^2(\lambda) \rfloor^{k+1} = \lfloor \chi_v^2(\lambda) \rfloor^k + R^{kl} + R^{ku}$$

Moving to a decision block 510, if the repeat and return to the block 506 to iterate toward upper bound if $k_u < U_b$ and return to the block 506 to iterate toward the lower bound if $k_l > L_b$. If either bound is reached, the method ends iteration in that direction along the probability density.

It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

Moreover, the steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Figure 6:
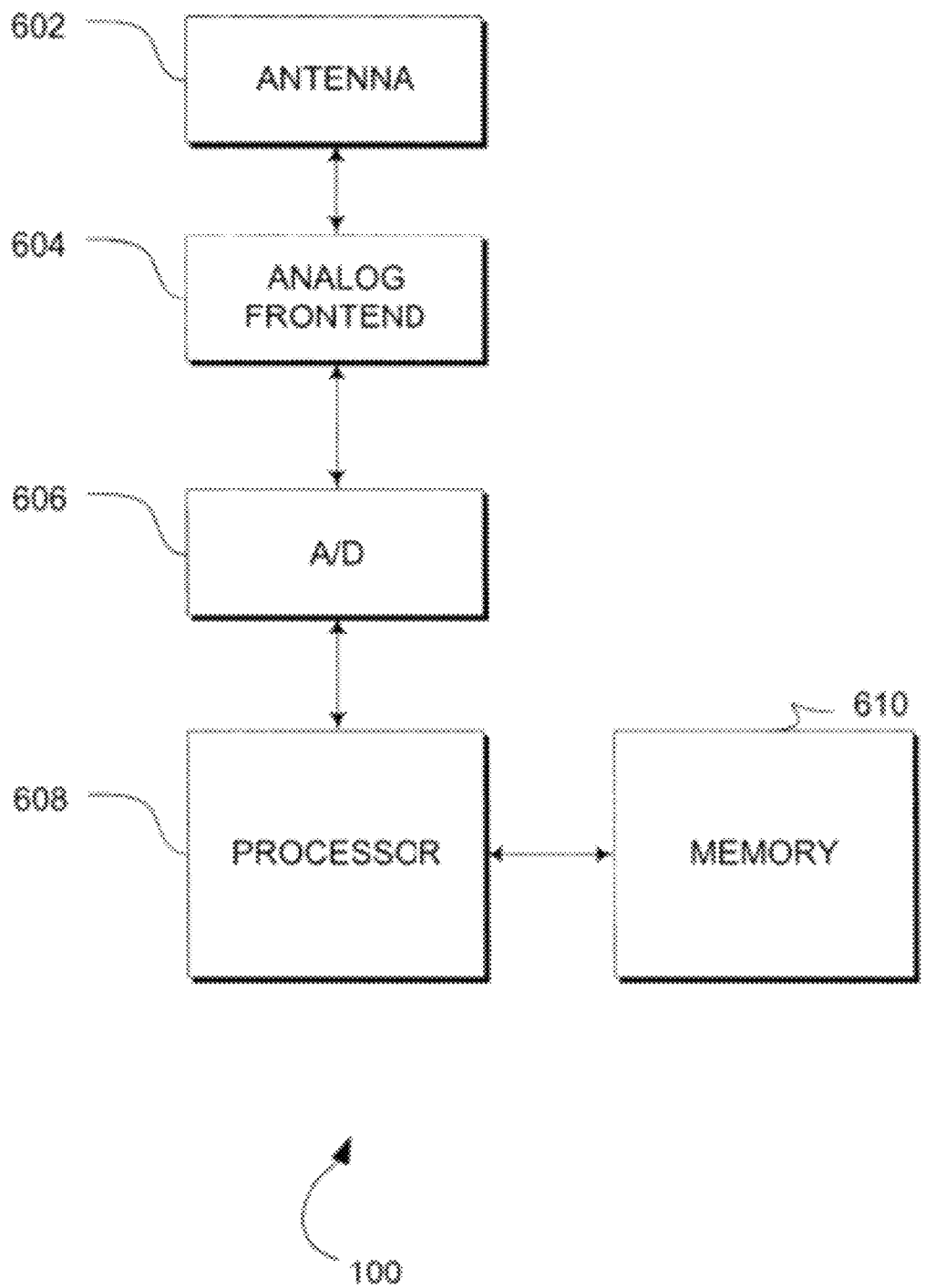
FIG. 6 is a block diagram illustrating an apparatus according to one embodiment of the system of FIG. 1.

FIG. 6 is a block diagram illustrating an apparatus according to one embodiment of the system 100. The system 100 includes an antenna 602 providing a signal to an analog frontend 604. The output of the analog frontend is processed by an A/D converter 606 to provide digitized signal data to a processor 609. The processor 610 stores signal and processing data in the memory 610. In one embodiment, the processor 610 provides the data to, or comprises, the information sink 108 of FIG. 1. The processor 610 may be configured to perform one or more of the functions of the envelope detection module 104 and the decision module 106. In one embodiment, an integrated circuit includes at least the processor 610 and, optionally, or alternatively, one or more additional circuits configured to perform the functions of the envelope detection module 104 and/or the decision module 106. One example of a communication system that may be implemented according to embodiments disclosed herein is described in "Orthogonal frequency division multiplexing with on-off keying, non-coherent performance bounds, receiver design and experimental results," Paul J. Gendron, U.S. Navy Journal of Underwater Acoustics, Vol. 56, No 2. pp 267-300, April 2006.

Figure 7:
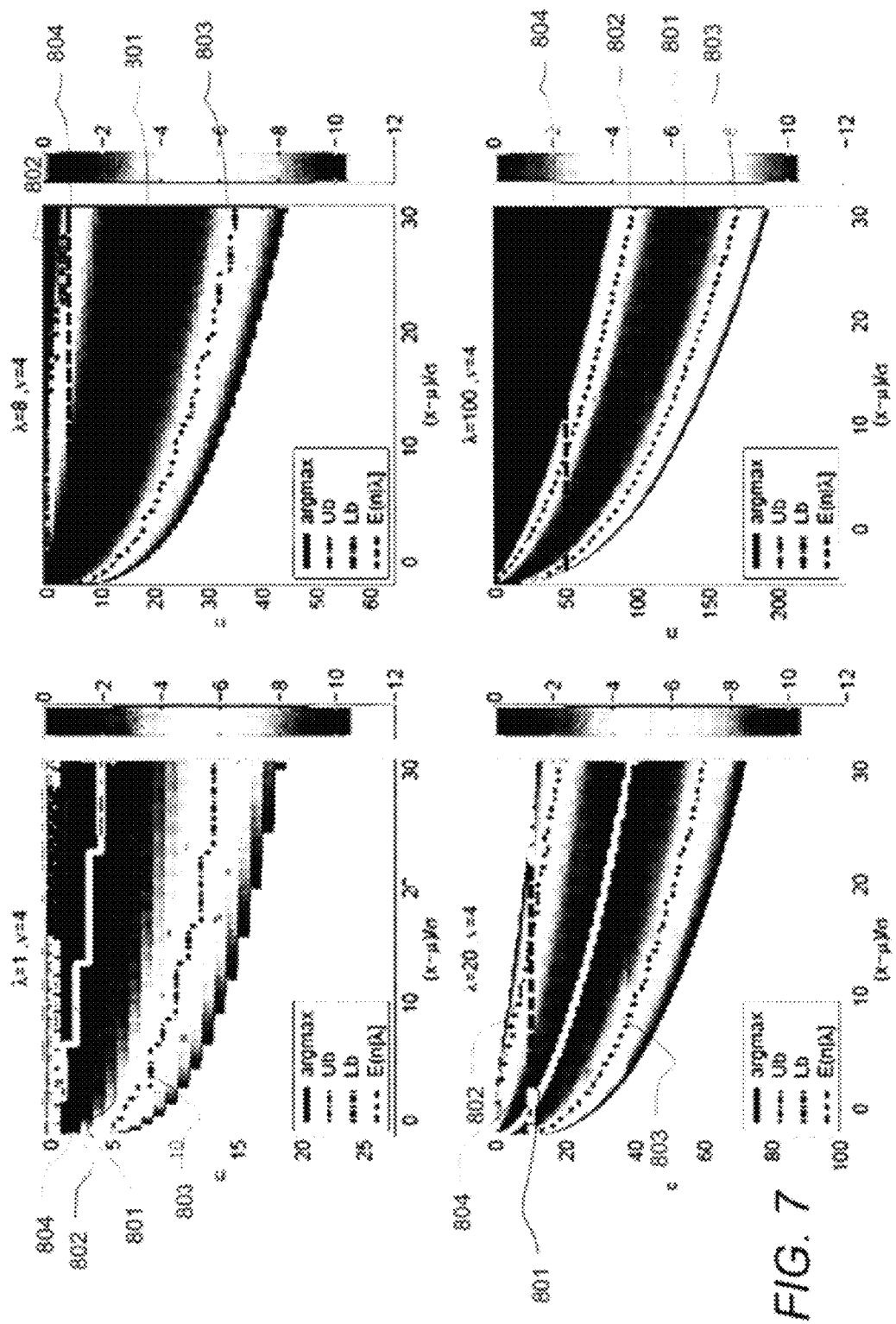
FIGS. 7 and 8 are graphical illustrations comparing results of the methods illustrated in FIGS. 3, 4 and 5.
Figure 8:
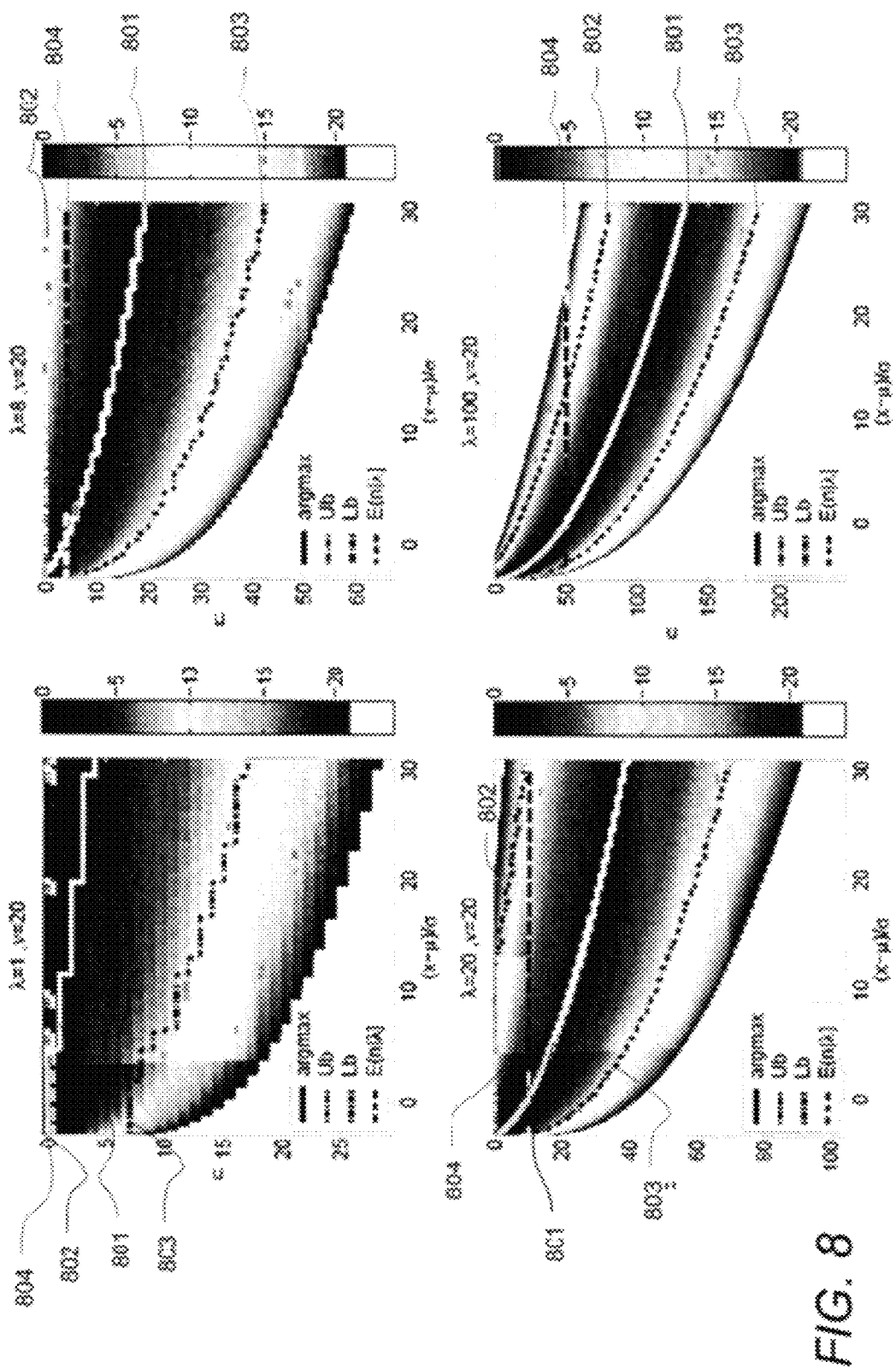

FIGS. 7 and 8 depict the normalized densities $f(x, n|\lambda, v)/\max_n f(x, n|\lambda, v)$ for $v=4$ and $v=20$ (via shading). Traces 801 illustrates the results of n* for the $\text{argmax}_n f(x, n''\lambda, v)$ (e.g., the method of FIG. 4). Traces 802 illustrate the results for n* based on $E[n|\lambda]$ (e.g., the method of FIG. 3). Traces 803 and 804 illustrate the upper and lower bounds respectively as calculated according to the method illustrated in FIG. 5. The horizontal axis reflects accuracy and the vertical axis the number of terms, n* calculated. The difference (improvement) between $E[n|\lambda]$ (traces 804) and the actual $\text{argmax}_n f(x, n|\lambda, v)$ (traces 801) in the tail regions is apparent. FIG. 7 illustrates the normalized joint density $f(x, n|\lambda, v)/\max_n f(x, n|\lambda, v)$ showing the peak (argmax) as a function of x for various noncentrality parameters $\lambda$. In FIG. 7, the upper ($U_b$) bound (traces 803) and lower ($L_b$) bound (traces 804) are associated with B=4 decimal place accuracy. FIG. 8 further illustrates the normalized joint density $f(x, n|\lambda, v)/\max_n f(x, n|\lambda, v)$ showing the peak (argmax) as a function of X. In FIG. 8, the upper ($U_b$) and lower ($L_b$) bounds are associated with B=8 decimal place accuracy. In FIGS. 7 and 8, the embodiments of FIGS. 3, 4, and 5 are compared to illustrate the value of accurate computation of n* and D(B) in the computation of the noncentral chi-square probability density function.

The difference between n* being based on $\text{argmax}_n f(x, n|\lambda, v)$ (e.g., the method of FIG. 4) and $E[n|\lambda]$ (e.g., the method of FIG. 3) is striking particularly for large $\lambda$. The lower and upper bounds associated with the specified decimal place accuracy B is depicted as well and shows that for the tail regions of the distribution the choice of $E[n|\lambda]$ in the method of FIG. 3 is outside of the band of significant terms. The implication is demonstrated for computation at accuracies of B=4, (i.e. $\epsilon=10^{-4}$), and B=8 for diverse noncentrality parameters. Notice that the number of terms for the method of FIG. 3 (n* starting at $E[n|\lambda]$ is much larger than for the methods illustrated in FIGS. 4 and 5 with no corresponding increase in accuracy. Precomputing the interval of summation via Equation (10) is shown to over estimate the interval for B=4 and $v=4$ while for B=8 and $v=4$ the interval is underestimated for noncentrality parameter $\lambda=1$. This illustrates a subtle weakness of the Laplace approximation approach. Nevertheless it is noteworthy that this approach outperforms the method of FIG. 3 by over 2×40 floating point operations per evaluation in the tail region since there are 2 additional floating point operation per iteration in the embodiment of FIG. 3 that are not necessary in the embodiment of FIG. 4.

It is to be recognized that while some embodiments are disclosed herein with respect to noncoherent communication systems, the disclosed methods of calculating a non-central chi squared probability distribution function can also be embodied in other applications. For example, one embodiment includes a module or function for evaluating a non-central chi squared probability distribution as described herein as part of a mathematical or statistical library and/or toolbox software. Such software may be embodied as a computer software product comprising instructions stored on a computer readable medium and executed by a processor.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A method of a non-coherent detection of a transmitted data signal, the method comprising:

receiving data indicative of a data signal by a non-coherent communications receiver;

evaluating, by the receiver, a non-central chi-square probability density function indicative of a parameter of the signal based on the received data, the non-central chi-square probability density function comprising a non-central chi-square distribution, the non-central chi-square distribution comprising a plurality of peak terms, wherein said evaluating the non-central chi-square probability density function indicative of the parameter of the signal comprises:

estimating the plurality of peak terms to be summed for evaluating the probability density function based on a specified accuracy, a number of degrees of freedom, and a non-centrality parameter associated with the probability density function, and by identifying the plurality of peak terms and a second moment of peak term weights prior to calculating a non-central chi-square density; and determining the signal parameter based at least in part on the received data and the calculated density, and one of making a detection decision in the receiver and assessing a performance of the receiver based on the determined signal parameter.

2. The method of claim 1, wherein the plurality of peak terms are summed from smallest in value to largest in value.

3. The method of claim 1, wherein the specified accuracy is associated with a number of digits of accuracy of each of the terms.

4. The method of claim 1, wherein determining the signal parameter comprises determining a demodulation decision of the received signal.

5. The method of claim 1, wherein determining the signal parameter comprises determining an error parameter associated with the received signal.

6. The method of claim 1, further comprising outputting by the receiver a demodulated data indicative of the data signal.

* * * * *